INVENTORS.
CHAO KONG CHOW
HARVEY ROSENBERG
BY James J. Wood
ATTORNEY

INVENTORS.
CHAO KONG CHOW
HARVEY ROSENBERG
BY James J. Wood
ATTORNEY

*INVENTORS.*
CHAO KONG CHOW
HARVEY ROSENBERG
*BY* James J. Wood
ATTORNEY

INVENTORS.
CHAO KONG CHOW
HARVEY ROSENBERG
BY James J. Wood
ATTORNEY

INVENTORS.
CHAO KONG CHOW
HARVEY ROSENBERG
BY James J. Wood
ATTORNEY

GRAPHIC CHARACTER RECOGNITION

Filed Nov. 2, 1959 7 Sheets-Sheet 6

INVENTORS.
CHAO KONG CHOW
HARVEY ROSENBERG
BY James J. Wood
ATTORNEY

INVENTORS.
CHAO KONG CHOW
HARVEY ROSENBERG
BY James J. Wood
ATTORNEY

United States Patent Office 3,096,506
Patented July 2, 1963

3,096,506
GRAPHIC CHARACTER RECOGNITION

Chao Kong Chow, Bryn Mawr, and Harvey Rosenberg, Drexel Hill, Pa., assignors to Burroughs Corporation, Detroit, Mich., a corporation of Michigan Filed Nov. 2, 1959, Ser. No. 850,443
16 Claims. (Cl. 340—146.3)

This invention relates to apparatus for graphic character recognition and more specifically to apparatus for magnetic character recognition.

While the instant invention has utility wherever characters or symbols must be identified for intelligence purposes, nevertheless, the solution which it affords finds particular applicability in the high speed digital computer art. In many applications, a major obstacle arises in handling information at the input of the computer proper. The computing operations, arithmetic or otherwise, can usually be accomplished with substantial rapidity—the problem arises in feeding the input data with sufficient speed to keep the computer in active operation. Stated differently, the inherent advantages of fast machine operation are considerably nullified if many more hours must be spent handling and arranging the information to be fed to the computer.

A classic example of this type of data processing arises in the mechanization of banking problems. The use of checks in personal and business transactions has expanded enormously in the last decade, and there is every indication that the increase will continue in the years ahead. A rather small bank, for example, having from 15,000 to 50,000 checking accounts may be called upon to process form 20,000 to 75,000 checks daily.

After some preliminary studies, the Office Equipment Manufacturers Institute and the American Bankers Association recommended magnetic character recognition for use in banking practice, the standard characters comprising ten decimal digits and four coding symbols each designed to be sufficiently different for machine recognition while still retaining sufficient detail of their orthodox counterparts to enable visual recognition. The characters are printed in magnetic ink of controlled density. The characters are magnetized, and the resulting magnetic field is caused to create flux linkages in a read head, the signal obtained being a function of the time rate of change of the flux linkages.

Each of the ten digits and four coding symbols has its own nominal readback voltage waveform, and the problem then arises to identify these waveforms with the accuracy demanded by banking practice. Recognition is complicated by the fact that since the check or other item contains may charatcers, one waveform is usually followed closely by another. Stated differently, since the waveforms are continuously varying with time, it is necessary to examine the waveform at the proper time to eliminate a spurious recognition. Further, there are departures from the nominal waveform because of such disturbances as malformation of the magnetic characters, or distortions in the formation of the magnetic characters because of rough handling of the item, and the like.

The technique for actually comparing a given readback voltage waveform with a stored representation for purposes of identification, is described in the copending patent application of Sheaffer and Seif, entitled "Voltage Comparison Circuit," Serial No. 789,983, filed January 29, 1959, and assigned to the assignee of the present invention. The instant invention is concerned with a method and means for minimizing the possibility of spurious recognition including a method and means for determining the optimum time at which the comparison should be made.

In accordance with a preferred embodiment of the instant invention there is provided magnetic character recognition circuitry for determining the optimum time $t_0$ at which comparison should be made between the readback voltage signal of a character to be identified, and the correct one of a plurality of stored representations of all possible characters. Means are arranged for developing a peaked waveform signal which is a function of the plurality of signals resulting from the application of said readback voltage signal to said stored representations, said peaked waveform signal having a maximum peak at $t_0$. Coarse timing means are adapted to same said readback voltage signal and to generate a sample interval signal having a time width $t_0—\Delta t_1$ to $t_0+\Delta t_2$. Fine timing means, enabled by said sample interval signal, are adapted to receive said peaked waveform signal, and to generate a fine timing signal at the occurrence of each ascending peak up to and including $t_0$, always ignoring peaks which are smaller than the largest previous peak.

Accordingly, it is an object of this invention to provide an improved apparatus for graphic character recognition in which identification of a readback voltage waveform occurs at the optimum instant in time.

A further object is to provide an improved apparatus for graphic character recognition in which the possibility of spurious response is substantially minimized.

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawings in which:

In order to place the instant invention in proper perspective, it will be helpful to briefly review the principles upon which magnetic character recognition is bottomed. The basic problem of character recognittion is to transform information from a series of printed characters and/or symbols into the binary form required by the computer logic. In the illustrative embodiment which will presently be described, the characters and symbols to be identified are printed in magnetizable ink. The item carrying this ink is then passed through a strong magnetic field to guarantee uniform magnetization, whereupon it is then passed under a read head. The magnetized ink causes flux linkages in the read head, the electrical signal from the head being proportional to the time rate of change in the flux linkages in accordance with the well known relationship:

$$e=\frac{-d\psi}{dt}$$

where $e$=the induced voltage and $\frac{d\psi}{dt}$=the change in weber turns per unit of time The resulting waveform must then be identified.

Figure 3:
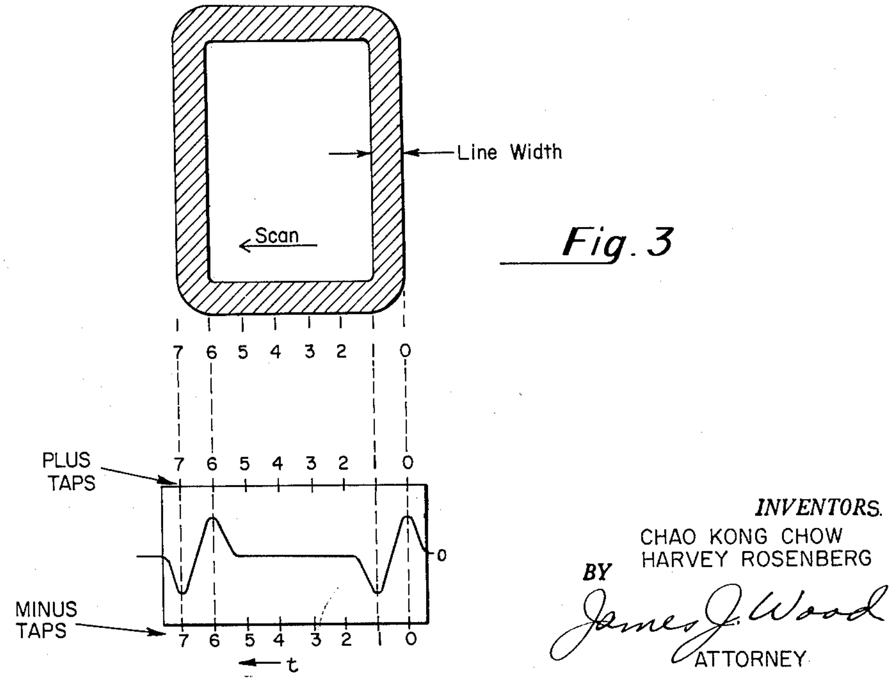
FIG. 3 is a view of the printed character "Zero" in accordance with the common language standard adapted by OEM—ABA, together with the identifying voltage vs. time waveform.

In one particular application of character recognition—the mechanization of banking problems—the Office Equipment Manufactureres Institute and the American Bankers Association agreed upon a standard of character font consisting of ten decimal digits (0 . . . 9) and four coding symbols; they are designed to be sufficiently different for machine recognition, while still retaining such resemblance with standard formations as to be visibly recognizable. The waveform for the OEM—ABA standard "Zero" is shown in FIG. 3.

There are three features of a readback voltage waveform which are used to identify a character: the position of the peaks in the character waveform, the polarity of the signal at various positions within the character, and finally the relative amplitudes of the peaks at these positions.

Figure 1:
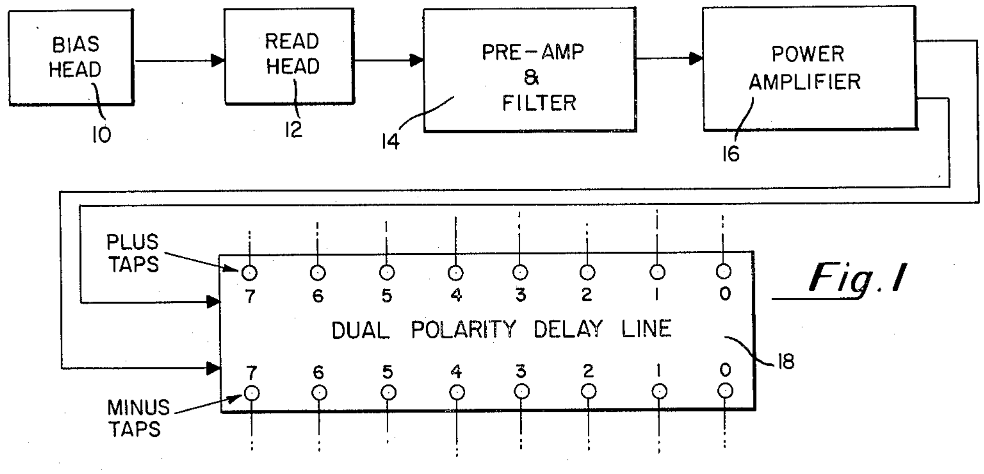
FIG. 1 is a block diagram depicting development of the signal to be recognized, and its application to a delay line.

Referring now to FIG. 1 of the drawing, an item (such as a check) bearing suitable characters or symbols in magnetizable ink is transported past a bias head 10 and a read head 12. The magnetizable ink on the item is generally magnetically neutral when first printed. However, the printing may later come into contact with a magnetic field which may magnetize the ink in some random orientation. Since it is necessary to remove this spurious magnetization, the bias head 10 performs this function by overriding any previous magnetic history of the ink. By virtue of the relative polarities of the bias head and the read hed, the first voltage peak of a character waveform in the time sense of FIG. 3 will always be positive, and the last peak negative. The low signal output of the read head is applied to a pre-amplifier and filter 14.

The basic character frequency is determined by the line width of the character (as defined in FIG. 3), and the velocity of the item past the read head 12. In the illustrative embodiment described herein, this frequency is 15.4 kilocycles. Since a single line width is the smallest dimension of interest, any frequency greater than 15.4 kilocycles is superfluous. Accordingly, in order to minimize noise such as that caused by discontinuities in the ink, the system signal path includes a pre-amplifier and filter 14 such that the system has a cut-off frequency of 16 kilocycles. The signal is next applied to a power amplifier 16 and then to a dual polarity delay line 18.

The purpose of the delay line 18 is to provide dynamic storage of the character waveforms, with provision, by means of appropriate taps, for measuring the waveform amplitude at specific intervals. The dual polarity line 18 comprises lumped constant (L—C) sections which configuration provides dual polarity; the concept of dual polarity has reference to the availability of ether polarity voltage waveform at any given tap interval along the line.

Figure 2:
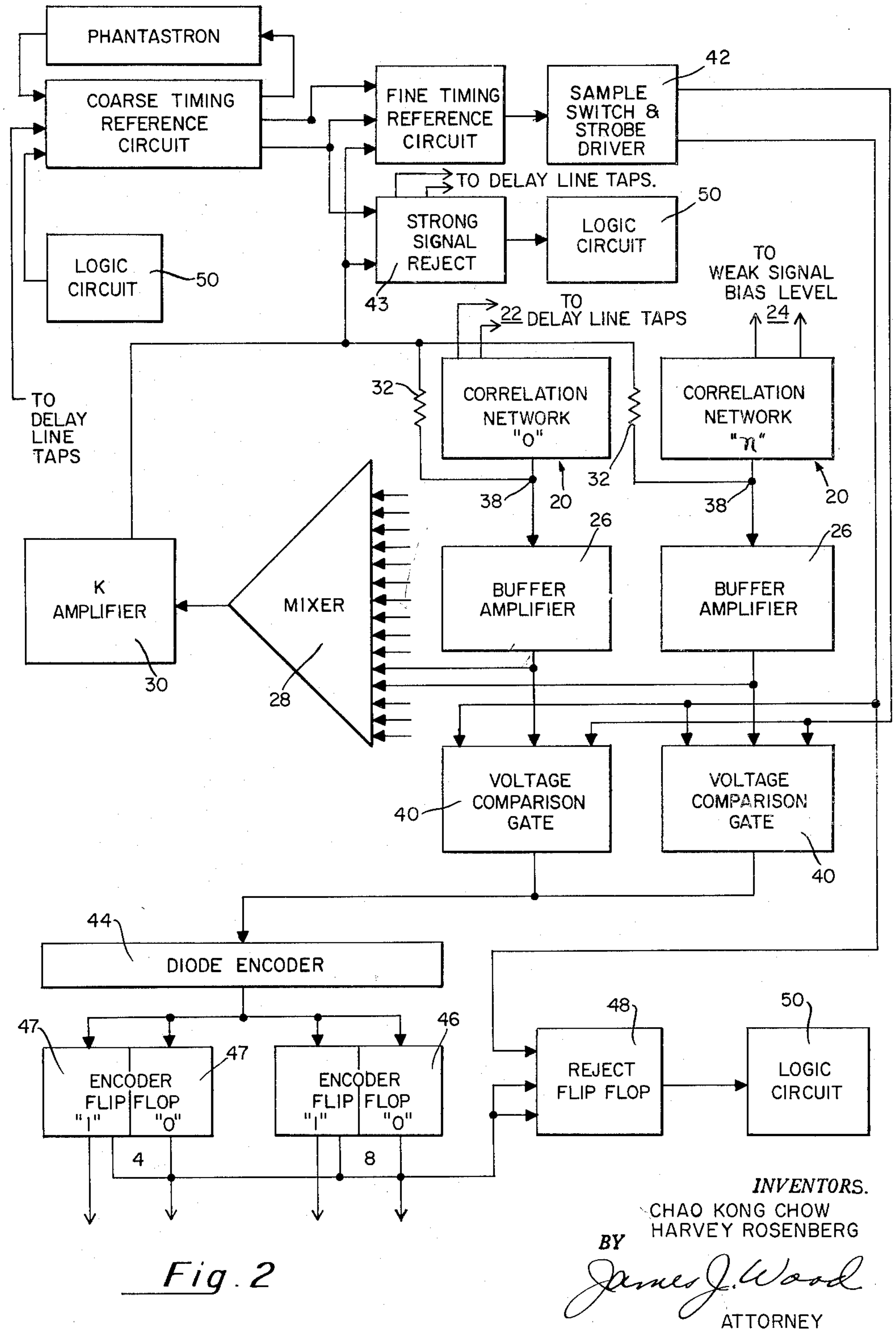
FIG. 2 is a block diagram supplementing FIG. 1, where FIGS. 1 and 2 considered together show the complete character recognition system.

Referring now to FIG. 2 of the drawings, correlation networks are indicated generally at 20, there being one network assigned to each character or symbol to be read, and in addition there is also one for rejection purposes as will be explained presently. A correlation network and its associated circuitry we shall define as a channel. In FIG. 2 only two channels are shown in the interest of simplicity: a "0" channel and a reject or weak signal channel indicated generally at 22, 24, respectively.

The correlation networks 20 are resistor networks for performing algebraic addition. These networks are described in greater detail in the copending application of Sheaffer and Seif for "Voltage Comparison Circuit," Serial No. 789,983, filed January 29, 1959. Briefly the networks store the ideal waveform of the digit or symbol to which they have been assigned. The various components of the network are connected to the dual polarity delay line taps in predetermined fashion. If the conductance values (G) of the resistive components of network 20 are plotted as ordinates against the delay line taps as abscissa, by assigning a conductance to the abscissa value in accordance with the tap to which it is connected, it will be found that the plot is the nominal waveform signal, in sampled form, which is assigned to that network. For example, the correlation network of the "Zero" channel 22 when so plotted would have the waveform shown in FIG. 3.

As the signal propagates along the delay line, various voltages are applied to the correlation networks 20 so that their respective outputs are changing in time. The problem is to determine the identity of the signal in the delay line. As described in the aforementioned copending application, this is accomplished by a waveform matching technique based on the auto-correlation and cross correlation functions of statistical mathematics which give a maximum value for the condition of best match. The auto-correlation function is given by:

$$\phi_{11}(t)=\lim_{T\to\infty}\frac{1}{2T}\int_{-T}^{T}f_1(\tau)\cdot f_1(\tau+t)d\tau$$

where $f_1(\tau)$ is any function of time and $f_1\ (\tau+t)$ is the same function shifted by a time $t$, where $t$ may be positive or negative.

It can be shown that the maximum value of $\phi_{11}$ occurs when $t=0$.

The cross correlation between $f_1\ (\tau)$ is given by $$\phi_{21}(t)=\phi_{12}(-t)=\lim_{T\to\infty}\frac{1}{2T}\int_{-T}^{T}f_2(\tau)\cdot f_1(\tau+t)d\tau$$

It can be shown that $\phi_{21}\ (t)$ can never be greater than $\phi_{11}\ (0)$ and at best can only be equal to $\phi_{11}\ (0)$. On a statistical basis, at most times the function $\phi_{21}\ (t)$ will be smaller than $\phi_{11}\ (0)$. Therefore when a signal is applied to its own correlation network, i.e. a "0" signal applied to a "0" correlation network, that output will be the greatest, and all others will be smaller, i.e. the output of a "0" signal applied to the 1, 2, 3, correlation networks, etc. will be smaller. The unlikely possibility of two correlation networks having outputs approaching the same magnitude is taken care of in a manner which will be explained.

The output of each correlation network 20 is applied to a buffer amplifier 26 having a gain very nearly equal to 1. The buffer amplifier is used for impedance matching, having an input impedance of 300K and an output approximately equal to 30 ohms. The output of each buffer amplifier is then fed to a diode mixer 28, the output of which is equal to the highest voltage received from any correlation network. The output from the diode mixer 28 is then applied to an inverting amplifier 30, from whence it is applied to the input of each buffer amplifier through a resistance 32.

Figure 4:
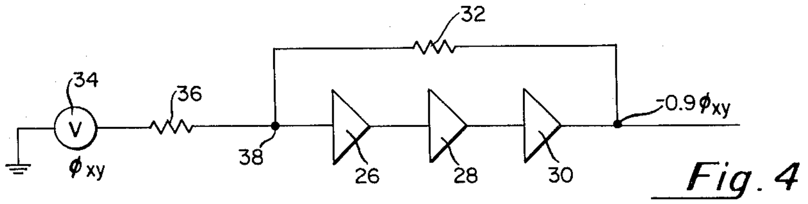
FIG. 4 is a block diagram showing how the buffer amplifier, mixer and inverting amplifier function as an operational amplifier.

As will be seen in FIG. 4, the buffer amplifier 26, diode mixer 28, inverting amplifier 30 and resistor 32 form a closed loop. The output of the inverting amplifier is —.9 of the highest equivalent voltage output of the correlation networks. The correlation networks 20 looking back from the input of amplifier 26 may be represented by a Thevenin equivalent circuit consisting of a generator 34 and a resistor 36. By design the Thevenin equivalent resistance 36 will be equal for all correlation networks 20, and, in this particular embodiment, the resistance 32 is made equal to resistance 36. The generator voltage 34 will have a magnitude dependent upon the signal being applied to the associated correlation network.

Let the symbol $\phi$ represent the voltage output from any correlation network and two subscripts represent respectively the character under detection and the network to which it is applied. Thus $\phi_{23}$ means the voltage caused by the application of the character 2 to the correlation network 3. (We shall consider only the digit characters at this point, omitting the symbols.) When reading the characters, if the outputs of the correlation networks 20 are examined at a precise time, which will be explained presently, the Thevenin generators will have voltages $\phi_{00}, \phi_{01}, \phi_{02} \ldots \phi_{09}$. By design of the correlation networks as described in the copending application supra, $\phi_{00}$ ($\phi_{01}, \phi_{02} \ldots \phi_{09}$). The resistors 32, 36, are in a 1:1 relationship so that the voltage at node 38 is one-half of the voltage of the Thevenin generator minus one-half of the output of the inverting amplifier 30. Thus if a "0" is in the delay line the voltage at the point 38 for the "0" network will be $$\frac{1}{2}[\phi_{00}-0.9\phi_{00}]=+.05\phi_{00}$$

If $\phi_{01}, \phi_{02} \ldots \phi_{09}$ are all less than $0.9\phi_{00}$, the corresponding point 38 on all the other correlation networks will be negative, and hence, one need only recognize which of these points is positive in order to identify the correct character. The factor 0.9 may of course be changed in magnitude; it is included here only by way of example.

In the process of identifying the voltage waveform in the delay line 18, the voltage comparison gates 40 are enabled by a signal from the sample switch and strobe driver 42. The sample switch and strobe driver 42 is described in greater detail in the copending application of Rosenberg for Sampling Circuit, Serial No. 57,428, filed on September 21, 1960, and assigned to the assignee of the instant invention. The single positive output from the correct buffer amplifier will pass through the appropriate gate 40 (FIG. 2) to a diode encoder 44 which will convert the waveform into binary form and apply it to the appropriate encoder flip-flops for temporary storage. In the illustrative embodiment, the identification is in the 8421 code. For simplicity only two encoder flip-flops 46 and 47 are shown representative of the places 8 and 4 respectively in the binary weighted code; it will of course be understood that in the actual embodiment two more encoder flip-flops are required for the 2 and 1 weighted places.

In the event that two buffer amplifier outputs are positive i.e. one of the correlation networks has an output magnitude greater than or equal to 90% of the correct correlation network output, then one or more of the encoder flip-flops will be pulsed on both inputs at the same time, which will cause a signal to be sent to the reject flip-flop 48, which in turn will send a signal to the logic circuit 50 to ignore the reading. In the case of a banking operation, this means that the check or other item will not be processed automatically, but will be rejected for hand posting. In effect this provides for the statistical possibility of the cross correlation function approaching within a specified percentage of the autocorrelation function.

The character recognition system will also reject an item when the signal is too weak i.e. less than 50% of nominal printing and when the signal is too strong i.e. greater than 250% of nominal printing. There are other causes for rejecting an item but they are controlled from the logic circuitry which inspects all information for completeness and correct format.

The weak signal rejection is accomplished by the addition of a fifteenth channel i.e. the weak signal channel, FIG. 2: 24. A weak signal D.C. bias level is applied which is equivalent to 90% of the weakest allowable signal. The correlation network 20 for the weak channel has an equivalent impedance which is the same as that of the other correlation networks. If the correct correlation network output falls below the weakest allowable value, an output will occur from both the "weak signal" and "correct signal" channels at sample time. An output from more than one channel is then interpreted by the reject flip-flop 48 and the logic circuit 50 as previously explained. If the signals are extremely weak such that the operational amplifier of FIG. 4 is only under the control of the weak signal bias, the item will be rejected because no output signals will be obtained from the fine timing reference circuit; the reason for this is that the fine timing reference circuit cannot operate with a D.C. level input—it responds only to waveform peaks.

When the signals become too strong the system becomes non-linear thus requiring additional means for rejection purposes. A strong signal reject circuit is indicated at FIG. 2: 43; this circuit is described in greater detail in the copending application of Rosenberg and Steckert for Monitoring Circuit, Serial No. 11,344, filed on February 26, 1960, and assigned to the assignee of the present invention. Briefly, the circuitry monitors the regions where strong signals may develop viz. at the output of the K amplifier, FIG. 2: 30, and the output of the power amplifier, FIG. 1: 16, by means of certain of the delay line taps.

*The Timing Technique*

The digits and symbols on the items are read continuously, the resulting characteristic voltage waveform being applied to the delay line 18. The process is a continuous one. As the characteristic waveform traverses the delay line, the voltage at any one tap varies continuously with time. Obviously there is one point in time when the waveform in the delay line is in the optimum position. The system is designed so that under ideal conditions, when the first peak of any given waveform is at the "0" tap, its corresponding correlation network will have its maximum output. However, in practical situations, because of certain variables such as poor printing or mutilations, etc., the waveform may be distorted, so that the maximum output from the correlation network in question will occur when the first waveform peak is in the region of the "0" tap (possibly slightly before or slightly after the zero tap). The instant invention provides a means for accurately determining the theoretical optimum time when the waveform should be sampled based in the correlation network outputs rather than when the first character peak arrives at a specific tap location.

The overall rationale of the timing technique consists of performing first a coarse timing function, and then a fine timing function. In effect, the coarse timing function states that a peak will occur within a given time interval; in the practical embodiment herein described this is a time interval of 40$\mu$ secs. The fine timing function then comes into operation during this interval and determines when the waveform is in the optimum position for sampling.

*Coarse Timing Reference Crncuit*

Figure 5:
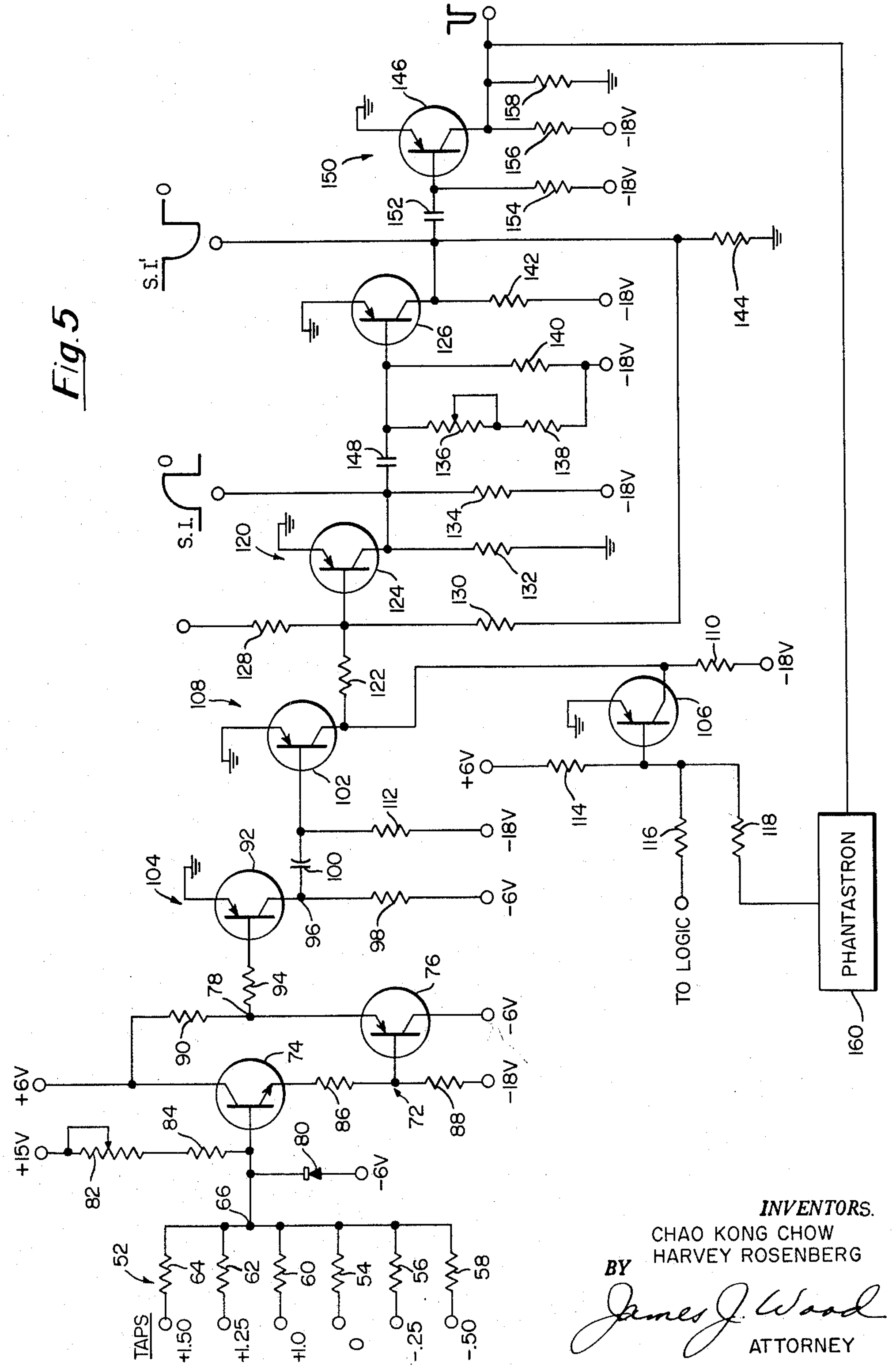
FIG. 5 is a diagram of the coarse timing reference circuit.

The coarse timing reference circuit is shown in detail in FIG. 5. For convenience, and as an aid to understanding the operation of this circuitry, reference will be had to FIGS. 6 and 7.

The waveform of the character or symbol being sensed may depart from the ideal in many respects. For example, irregularities in printing may present minor spurious peaks superimposed on the nominal peak. It is therefore necessary to average the waveform over several tap intervals to obtain a smoothing effect to insure success in timing. Accordingly, the waveform passing down the delay line is tapped at discrete fractional intervals in proximity to the "0" tap so as to provide a derived signal which contains electrical information useful in developing a coarse timing or sample interval signal.

The derived signal network indicated generally at 52, comprises a plurality of resistors 54, 56, 58, 60, 62, 64, connected in common at one end 66, the other ends being connected to the 0, −.25, −.50, +1.0, +1.25, +1.50 taps of the delay line respectively. The voltage signal of FIG. 7(A) corresponds to the waveform as seen at tap "0" time. If it is assumed that the waveform shown in FIG. 7(A) is being tapped at the intervals indicated, then the resulting waveform will be as indicated in FIG. 7(B). In effect the network 52 has substantially (*a*) smoothed the waveform (*b*) partially differentiated the waveform by the sampling process and (*c*) provided the resulting waveform with a phase lead. The important part of waveform 7(B) is the crossover point 68. This point substantially determines the beginning of the sample interval (S.I.). The point 70 on FIG. 7(A) corresponds in time to point 68 so that it is evident that the sample interval will begin before the delay line waveform FIG. 7(A) reaches its peak.

The output of the network 52 is applied to a buffer amplifier with an adjustable clipping level indicated generally at 72. The buffer amplifier comprises transistors 74, 76 arranged in cascade, and, as emitter followers in this particular application, having a D.C. offset of +1.5 volts with reference to circuit point 78. The output wave for the buffer amplifier 72 appears at 78 and has the appearance shown in FIG. 7(C).

A clamping diode 80 is connected to the base of transistor 74. The biasing potentials for the transistors 74, 76 have the magnitudes indicated on the drawing, and are applied through resistors 82, 84, 86, 88, 90, respectively.

Figure 6:
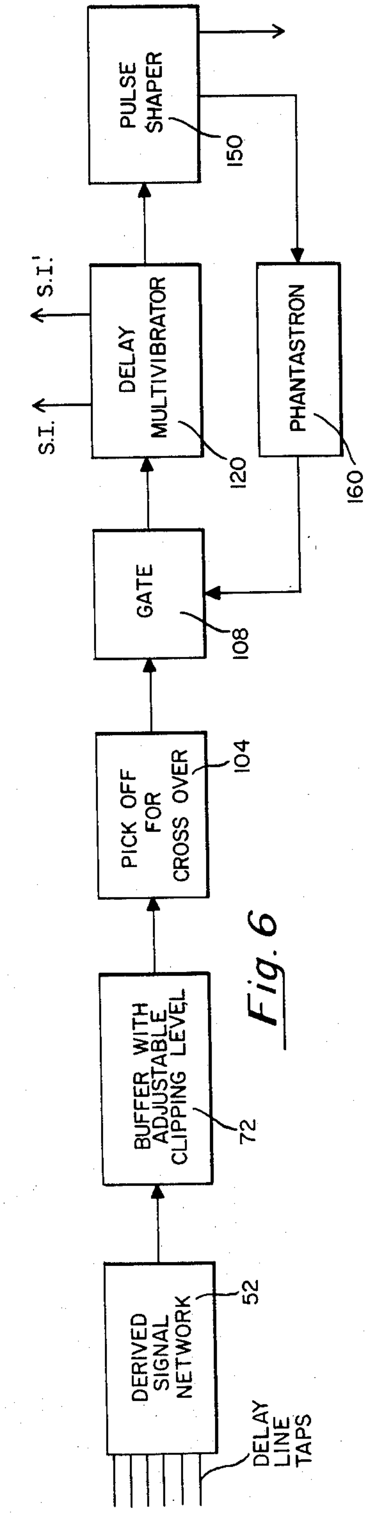
FIGS. 6 and 7 are block and waveform diagrams respectively, used in explaining the operation of the circuitry of FIG. 5.
Figure 7:
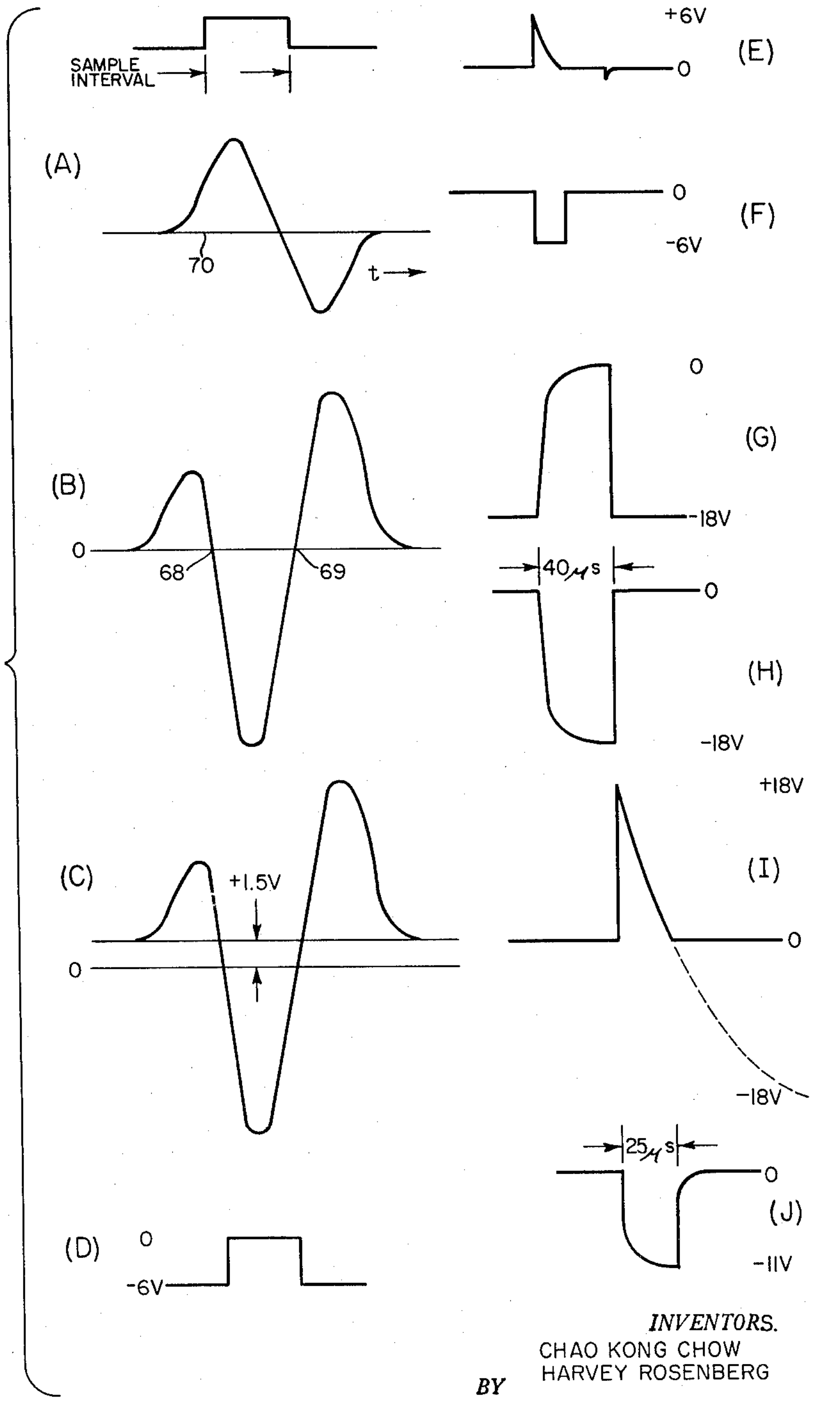

The signal shown in FIG. 7(C) is next applied to the base of transistor 92 through a resistor 94. The transistor 92 is arranged in the grounded emitter configuration. The collector potential −6 v. is applied through resistor 98. The output of transistor 92 is applied to the base of transistor 102 through a capacitor 100. The transistor 92 functionally constitutes the pick off for crossover circuit 104 (FIG. 6).

Transistor 92 is normally "OFF"; its collector 96 is therefore at −6 v. Upon the application of the waveform FIG. 7(C), the transistor 92 remains cut off until the input wave passes through zero and goes negative. This causes the collector voltage to quickly rise from −6 v. to 0 as shown in FIG. 7(D). Conduction continues during the negative half of the input with the result that a rectangular pulse is developed at the collector 96 of transistor 92. The pulse has a width which is a function of the crossover points 68, 69, FIG. 7(B).

The transistors 102 and 106 function as a gate circuit indicated generally at 108 (FIG. 6); when either one of these transistors is conducting there is no output from the gate.

The transistors 102 and 106 are connected in the grounded emitter configuration. Their collectors are connected together and to a source of biasing potential through a resistor 110. The base of transistor 102 is connected to the output of the pick off circuit 104 and to a source of biasing potential through a resistor 112. The base of transistor 106 is connected to a source of biasing potential through a resistor 114, and to two inputs applied through resistors 116 and 118 respectively. The output from the gate 108 is applied to a delay multivibrator indicated generally at 120, through a resistor 122.

The transistor 102 is normally "ON" while transistor 106 is normally "OFF." As previously stated, this means there is no output from the gate 108. The pulse (FIG. 7(D)) after passing through the capacitor 100 has the appearance shown in FIG. 7(E). The application of the positive going pulse (FIG. 7(E)) to the base of transistor 102 drives its collector negative, resulting in the application of the negative pulse (FIG. 7(F)) to the delay multivibrator 120.

The delay single-shot multivibrator 120 is conventional. The biasing potentials are applied through resistors 128, 132, 134, 136, 138, 140, 142, 144; the feedback resistor is shown at 130. Transistor 124 is coupled to transistor 126 by means of capacitor 148.

Transistor 124 is normally "OFF", while transistor 126 is normally "ON." Upon the application of the negative going pulse, FIG. 7(F), transistor 124 conducts, and transistor 126 turns "OFF." Regenerative feedback keeps the circuit in this state until a time determined by the coupling time constant (capacitor 148 and the equivalent input to the transistor 126) the circuit then returns to normal.

The sample interval signal (S.I.) developed at the collector of transistor 124 is shown in FIG. 7(G); the inverted sample interval signal (S.I.′) developed at the collector of transistor 126 is shown in FIG. 7(H).

The output of the delay multivibrator 120 is applied to a differentiating pulse shaper indicated generally at 150. The pulse shaper 150 comprises transistor 146 arranged in the common emitter configuration, capacitor 152 and resistor 154, with collector potential applied via resistors 156, 158. The output potential is developed across resistor 156, 158 in parallel (A.C. equivalent load).

When the inversion of the coarse timing pulse (S.I.′) FIG. 7(H) has decayed to −18 v., the base of the transistor 146 is still at ground (0 volts). As the collector of transistor 126 heads for ground, the potential of the base of transistor 146 rises to +18 v. by virtue of the fact that the charge on a condenser cannot change instantly (FIG. 7(I)). The base of transistor 146 (FIG. 7(I) begins to decay toward a negative voltage as the condenser 152 discharges toward −18 v., and as it reaches ground, the transistor 146 again conducts, driving its collector up toward 0 volts (FIG. 7(J)); the waveform is applied to a phantastron circuit indicated generally at 160 which sends a negative gating waveform signal pulse to the base of transistor 106 driving it "ON." The phantastron 160 is of conventional construction and need not be described in detail since it forms no part of this invention; it is driven in the monostable mode. The gate 108 will not now pass any further pulses from transistor 92. For certain purposes the logic circuitry may also send a negative gating waveform to the transistor 106, driving it "ON," thus inhibiting gate 108.

In the practical embodiment here described, the negative gating output signal of the phantastron has a time width of 215 microseconds. The phantastron thus blanks the coarse timing reference circuit during this interval. Stated differently, the phantastron disables the gate 108 during this interval, and thus blocks all other positive peaks within the character readback signal.

*Fine Timing Reference Circuit*

Figure 9:
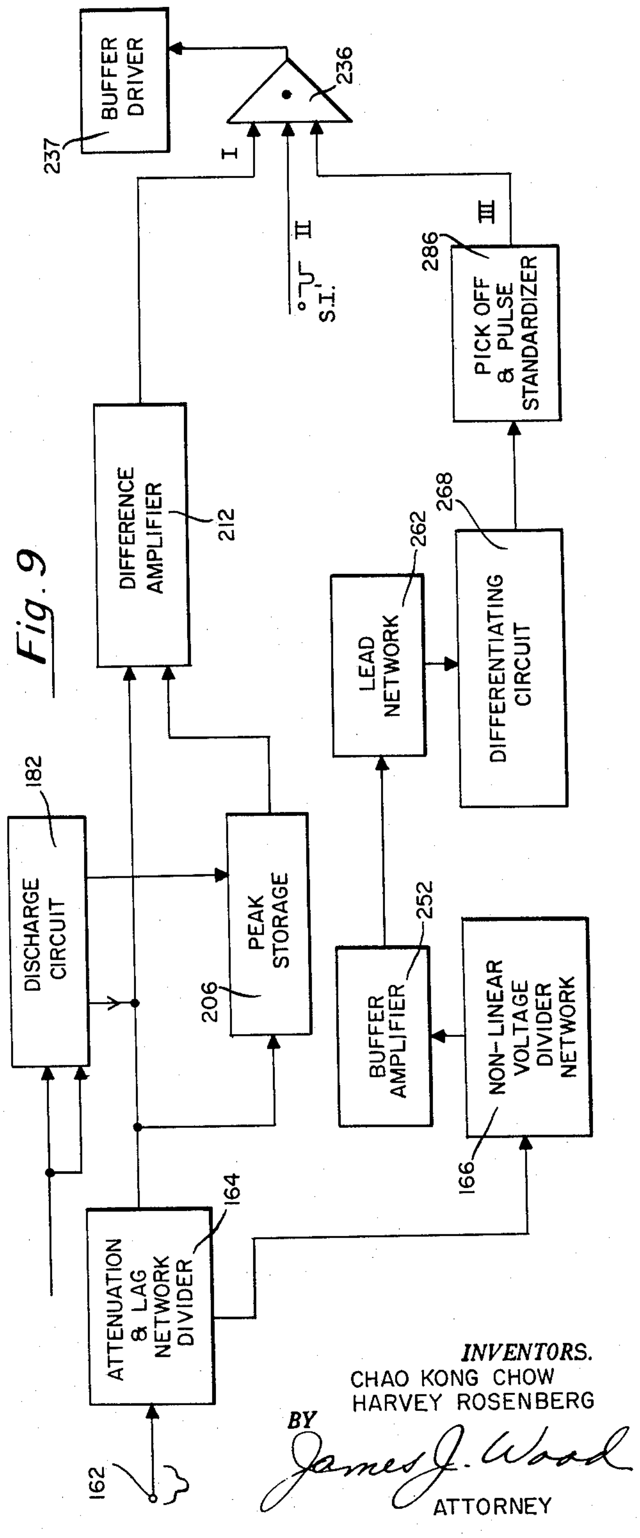
FIG. 9 is a block diagram of the circuit of FIG. 8.
Figure 8:
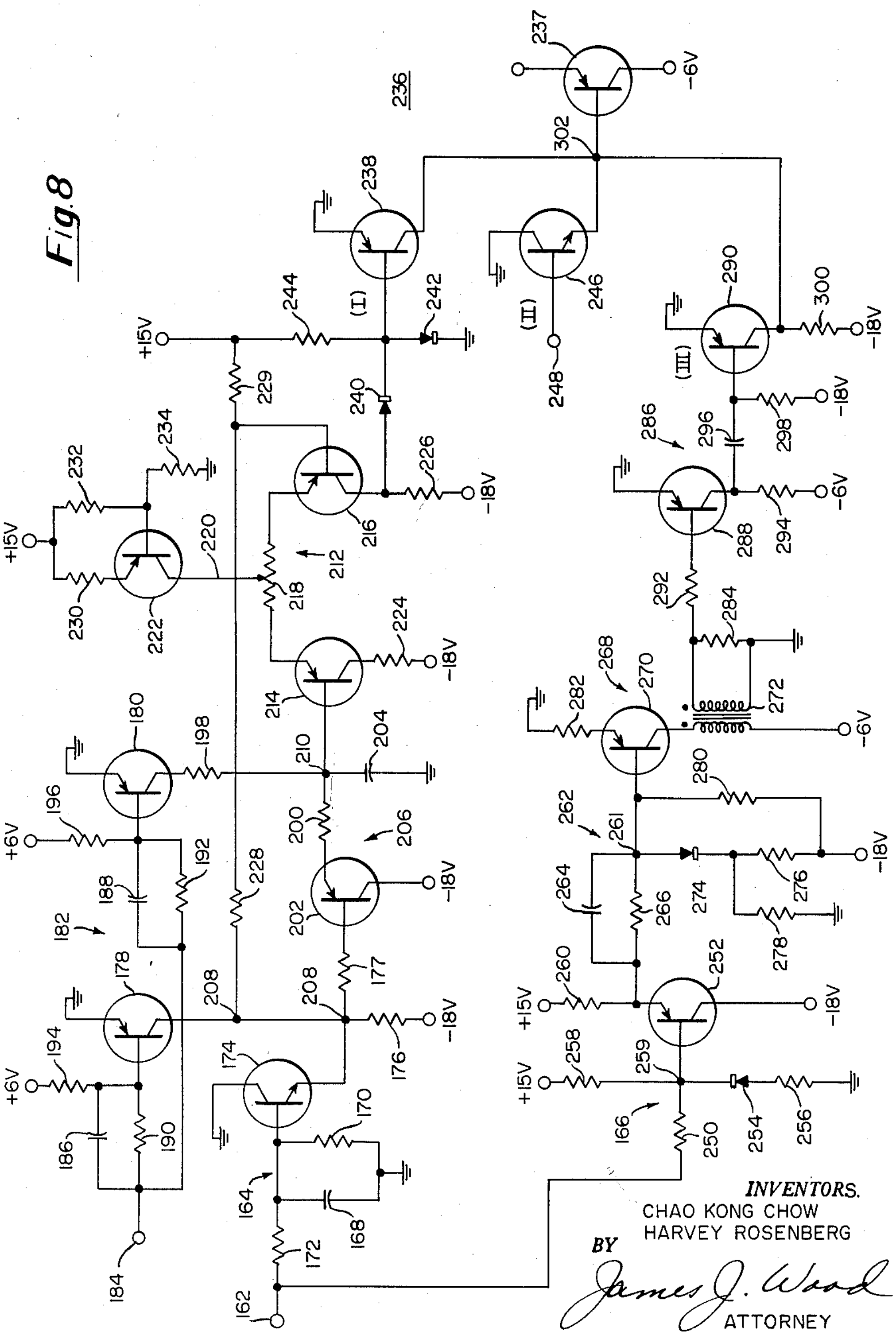
FIG. 8 is a diagram of the fine timing reference circuit.

The fine timing circuitry is shown in detail in FIG. 8; a functional block diagram of this circuitry is shown in FIG. 9.

The coarse timing reference circuit has now supplied a sampling interval signal (S.I.) to the fine timing reference circuit; before the reception of this signal the output of the fine timing reference circuit is inhibited.

The output of the inverting amplifier 30 (FIG. 2) is applied to the fine timing circuit at input terminal 162. An attenuating lag network and a non-linear voltage divider network, indicated generally at 164 and 166 are connected in common with terminal 162. The network 164 comprises a capacitor 168 and a resistor 170 arranged in parallel, and connected at one end to ground, the other end being connected to terminals 162 through resistor 172. The output of the attenuating lag network 164 is applied to the base of a transistor 174. The latter transistor is arranged in the common collector configuration; the emitter is connected to a source of negative potential through a resistor 176 and also to the collector of transistor 178.

The transistors 178 and 180 constitute a discharge circuit indicated generally at 182; these transistors are arranged in the grounded emitter configuration. The dual input to the discharge circuit 182 is applied between terminal 184 and ground through R-C networks comprising capacitors 186, 188 in parallel with resistors 190, 192, respectively. Polarizing potentials for the bases of the transistors 178, 180 are applied through resistors 194, 196, respectively. The collector of transistor 178 is connected to the emitter of transistor 174 at terminal point 208; the collector of transistor 180 is connected to a source of negative potential through resistors 198 and 200, through the gating transistor 202. The emitter of transistor 174 is connected to the base of gating transistor 202 through resistor 177. The junction of resistors 198 and 200 is identified as output point 210 which is, in turn, connected to the emitter of transistor 202 through resistor 200. The collector of transistor 180 is also connected to ground through the serial combination of resistor 198 and capacitor 204 as shown in the drawing. The capacitor 204 and the transistor 202 constitutes the peak storage component indicated generally at 206.

A difference amplifier indicated generally at 212 comprises transistors 214, 216. The emitters of the transistors are connected together by means of a potentiometer 218, the sliding contact 220 of which is connected to a transistor 222 which operates as a constant current source. The collectors of transistors 214, 216 are each connected to an appropriate source of negative potential through resistors 224 and 226 respectively. The inputs of the difference amplifier 212 are applied to each base respectively: the base of transistor 214 is connected to the peak storage terminal point 210; the base of transistor 216 is connected to the discharge circuit 182 at terminal point 208 through resistor 228. The base of transistor 216 is connected to the input side of the peak storage circuit (terminal point 208) through a divider network comprising resistors 228, 229, as shown.

The constant current source 222 is operated in the grounded-base configuration. The emitter is connected to a source of positive potential through resistor 230, the base is connected at the junction point of resistors 232, 234, these resistors being serially connected between a source of positive potential (+15 v.) and ground.

An AND gate, indicated generally at 236, comprises transistors 238, 246 and 290 operating with a common load 300. The output of the AND gate 236 is applied to an output buffer driver comprising transistor 237 driven in the emitter follower configuration.

The output of the difference amplifier 212 is applied to the AND gate 236. A Zener diode 240 is serially connected between the collector of transistor 216 and the base of transistor 238. The base of transistor 238 is connected to a source of biasing potential (+15 v.) through resistor 244. The diode 240 functionally serves to change the D.C. level without experiencing an A.C. loss. A diode 242 is connected between the base of transistor 238 and ground, the cathode side of the diode being grounded. The diode 242 serves to limit back biasing of the emitter junction of transistor 238 when diode 240 disconnects. The components in the fine timing control circuitry which have been described so far, provide one negative input to the AND gate 236. It will be most convenient to postpone consideration of the overall operation of these components until the entire circuitry has been described.

A second negative input for the AND circuit 236 is applied by means of transistor 246 operated as a grounded collector stage. The input to transistor 246 is applied between terminal 248 and ground, terminal 248 being connected to the base of transistor 246. The emitter of transistor 246 is connected to the base of transistor 237.

The third negative input for the AND gate 236 will now be described. The non-linear voltage divider 166 comprises resistor 250 connected to the base of a transistor 252, which is arranged in the common collector configuration, the serial combination of diode 254 and resistor 256 connected between the base of transistor 252 and ground, and resistor 258. The transistor 252 is operated as a buffer amplifier. The emitter biasing potential is applied through resistor 260. The output of the buffer amplifier is fed to a lead network indicated generally at 262. The lead network 262 is connected to a differentiating circuit indicated at 268, comprising a transistor 270 and a pulse transformer 272.

The lead network 262 comprises capacitor 264 in parallel with resistor 266, and the input impedance to the differentiating circuit 268. A diode 274 has its anode connected to the base of transistor 270 and its cathode connected to a resistor 276, the other end of the resistor being connected to a source of negative potential. A resistor 278 is connected between the cathode of diode 274 and ground. The serial combination of diode 274 and resistor 276 is shunted by a resistor 280. The components: diode 274, resistor 278, resistor 276, and resistor 280 function as a biasing network for transistor 270 and also as a D.C. restoration circuit.

The emitter of transistor 270 is connected to ground through resistor 282. The collector of transistor 270 is connected to a source of negative potential through the primary of transformer 272. The secondary of transformer 272 is shunted by a resistor 284, one end of the secondary being grounded as shown.

The output of the differentiating circuit 268 is applied to a pick off and pulse standardizer circuit indicated generally at 286. The latter circuit comprises transistor 288, capacitor 296, resistor 298, and transistor 290. The output of the differentiating circuit 268 is applied to the base of transistor 288 through resistor 292. Biasing potential for the collector of transistor 288 is applied through resistor 294. The collector of transistor 288 is coupled to the base of transistor 290 through capacitor 296. Biasing potentials for the base and collector of transistor 290 are applied through resistors 298 and 300 respectively. Finally the collector of transistor 290 is connected to the base of output buffer driver 237.

The operation of the fine timing circuit of FIG. 8 can best be understood by considering, in turn, each of the three main signal flows which culminate in the operation of the AND gate 236; this gate is of the three negative input type, so that driver 237 cannot provide a negative output pulse until all three of its inputs are negative. The parts of the circuit which contribute the negative signals have been indicated by Roman numerals I, II and III in FIGS. 8 and 9.

Transistor 246 is normally conducting. The inversion of the sample interval pulse (S.I.′) is applied to the base of transistor 246, causing it to cut off. The emitter of transistor 246 therefore tends to fall toward —18 v., but if transistor 238 and/or transistor 290 are conducting through common load resistor 300, then point 302, i.e., the base of transistor 236 remains at ground potential. The sample interval (S.I.′) in effect enables the output of AND gate 236 during the sample interval.

The output of the —K amplifier 30 is applied to the non-linear voltage divider circuit 166. The output of the amplifier 30 (superimposed on a D.C. level) may be illustrated by the waveform shown in FIG. 10(B). As will be seen from a study of this figure, the waveform comprises a plurality of peaks (only three are shown here for convenience) which may result from the application of signals in the delay line to the various correlation networks. For purposes of explanation, we shall assume that peaks 304, 306, 308, represent $\phi_{03}$, $\phi_{00}$, $\phi_{06}$, that is, the waveform resulting from the application of the zero signal to correlation networks "3," "0" and "6" respectively. Our problem is to identify the largest peak 306, which by definition corresponds to the character stored in the delay line 18 (FIG. 1).

In one particular embodiment, the "K" output signal (FIG. 10(B)) was at a level =—4 with the peaks having a magnitude in the order of .3 to 70 volts below this level. In order to permit operation within the ratings of the transistors, a non-linear attenuation of the input signal is required. The circuitry 166 makes use of the non-linear impedance characteristic of the diode 254 in the forward and reverse directions to provide voltage dividing action in cooperation with resistors 250, 256, and 258. Thus the voltage input to the base of transistor 252 is essentially (since resistor 258 is large):

$$\frac{\text{Input Voltage X (resistance of diode 254+resistor 256)}}{\text{Total resistance of resistor 250+diode 254+resistor 256}}$$

The resistor 258 is included here to pull up node 259 to approximately +1 volt; at this potential, the diode 254 is cut off under standby conditions. With the aforesaid working signal range of .3 v. to 70 v., it is desired that the network enable more gain to be obtained at low input signals, and less gain to be obtained at high input signals. At low input signals, the diode 254 is cut off so that the signal to the base of transistor 252 is a function of the voltage dividing action of resistor 250 plus the input impedance to transistor 252 shunted by resistor 258. When the input signal exceeds 1 volt, the diode 254 is now forward biased, thus lowering the input impedance (in the order of 7 to 1) thereby lowering the gain.

Thus the diode 254 protects the transistor 252 at high voltages and also enables one to obtain voltage gain at low input signals. The resistor 256 is added to insure partial diode clipping since it is desirable to retain some peaking in the signal input to transistor 252.

The transistor 252 is driven as a buffer amplifier in the emitter follower configuration; its output is applied to the lead network 262 which introduces a leading phase shift thereto. The purpose in introducing the phase shift to insure early cross over of the output signal of the differentiating circuit 268, where cross over is defined as the point where the output signal crosses the time axis after passing through 180° (electrical degrees). The leading edge of the output signal of circuitry III (FIG. 10(F)) is a function of this cross over point, and hence, the lead network 262 insures that the signal will not be developed late.

The output of the lead network 262 is applied to the differentiating circuit 268. The transistor 270 and the transformer 272 constitute the differentiating circuit; the equivalent circuit of these components is a resistor in series with an inductance, the output being developed across the inductance. The plot of the log of the amplitude of the output signal vs. the log of the frequency has a slope of 6 db per octave, so that within the frequency range of this slope differentiation takes place. The output of the differentiating circuit 268 is next applied to the pick off and pulse standardizer 286.

The circuitry 286 comprises transistor 288, capacitor 296, resistor 298 and transistor 290. The pick off means here comprises transistor 288, the rest of the components serving the function of pulse standardization. Transistor 288 is normally "OFF" and transistor 290 is normally "ON." Prior to the application of a signal to the circuit 286, the collector of transistor 288 is at −6 v., and the capacitor 296 is substantially charged to −6 v. With the application of a negative going pulse (FIG. 10(E)) to the base of transistor 288, the transistor conducts causing its collector to rise quickly toward ground; the charge in condenser 296 cannot change instantly so the other side of the condenser rises to +6 v. Since transistor 290 is operated in the common emitter configuration, the positive going pulse seen by the base, cuts off transistor 290 causing a negative-going pulse at the collector (FIG. 10(F)). This places the gate 236 in a position to conduct if its other two inputs permit it to do so. Thus the potential rise of the base of transistor 290 toward +6 v. causes it to be cut off. The condenser 296 then begins to charge from +6 v. toward −18 v., and as it passes through zero, the transistor 290 again conducts.

The circuitry III produces an output for each peak 304, 306, 308, etc. The problem remains to determine the maximum peak—this is the function of circuitry I.

The operation of the ascending peak detector (circuitry I) will now be described. The transistors 178, 180, constituting the discharge circuit, are arranged to be normally "ON." This tends to drive the output points 208, 210 toward ground or slightly positive. The circuitry I thus produces no output because transistor 174 is cut off; it should be borne in mind that the terminal 162 is at approximately −4 v. with respect to ground. When the sampling interval pulse S.I. is applied at terminal 184, a positive going pulse is applied to the bases of transistors 178, 180 causing them to cut off. This in effect removes the ground from the output terminals 208, 210 and the potential of these points drops toward a negative magnitude determined by the input terminal 162.

The attenuation and lag network 164 provides attenuation of the signal by the voltage dividing action of resistors 170, 172, and the capacitor 168 provides a phase lag. The purpose of introducing a phase lag is to prevent a time race between circuitry I and III. When the potential of terminal 208 becomes sufficiently negative, emitter-follower 174 conducts. The resulting signal is applied to the base of transistor 216 through resistor 228, and to the base of transistor 202 through resistor 177.

The transistor 202 conducts, capacitor 204 charging through resistor 200 and transistor 202; the charge on the capacitor 204 is applied as a signal to the base of transistor 214. The capacitor 204 operates as a peak storage device, and the charging curve is shown in FIG. 10(C). Transistor 202 is operated as an emitter follower, so that as a signal (FIG. 10(B)) applied to its base varies, the emitter follows. The capacitor 204 is connected to the emitter of transistor 202, and it charges to the first peak 304 of the input signal. As the waveform passes the peak and becomes more positive, since the charge on a capacitor cannot change instantly, the capacitor substantially retains its charge as indicated FIG. 10(C), because transistor 202 is cut off.

Figure 10:
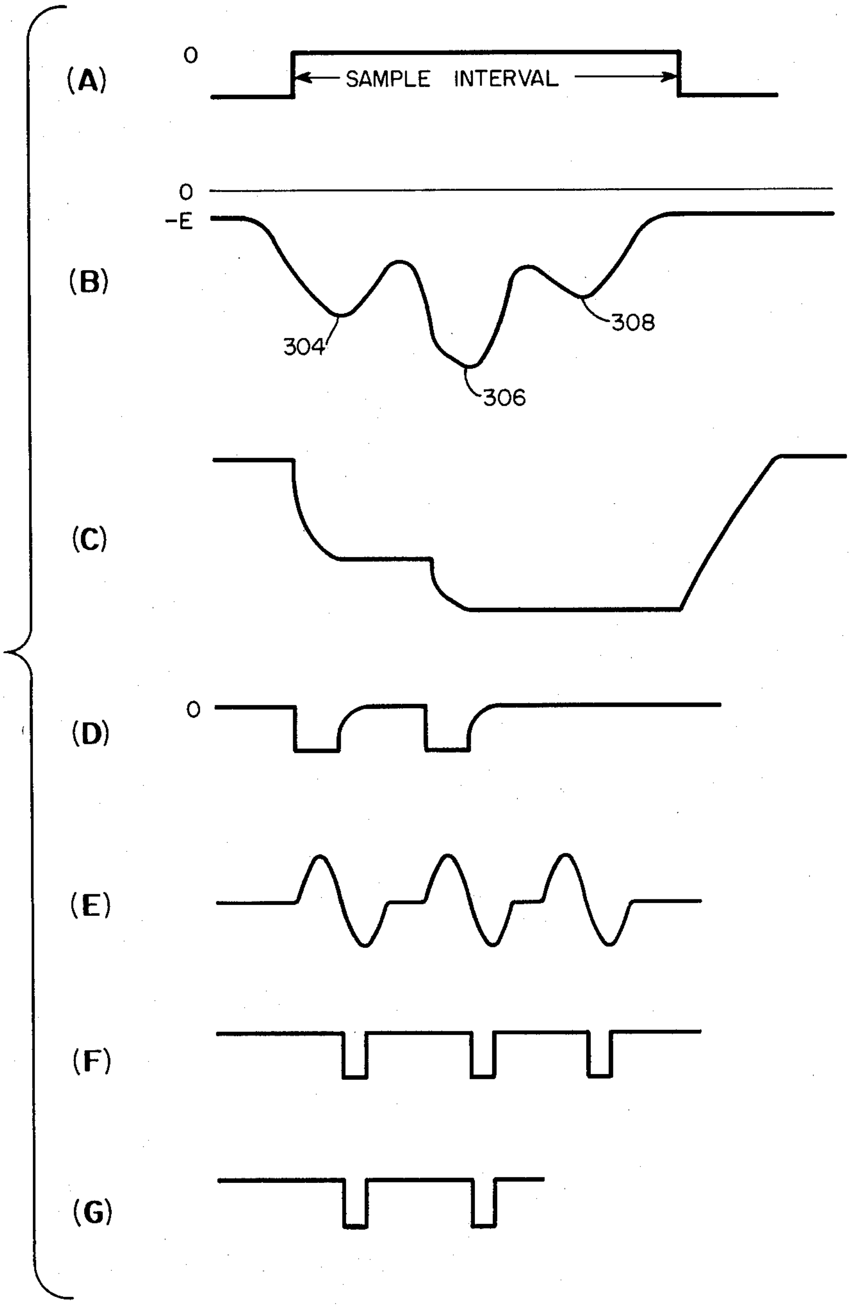
FIG. 10 is a series of voltage waveforms used in explaining the operation of the fine timing reference circuit shown in FIG. 8.

The circuit 212 is operated as a difference amplifier, with the inputs shown in FIG. 10(B) and FIG. 10(C) respectively. The amplifier 212 therefore has an output only when there is a difference in its input; the output taken from the collector of transistor 216 is shown in FIG. 10(D). When the output waveform (FIG. 10(D)) reaches the extinguishing voltage of the Zener diode 240, conduction no longer takes place through the Zener diode 240, and transistor 238 is cut off, thus permitting the circuit point 302 to go negative if the other two inputs to the AND gate 236 are negative.

In summary, assume that a waveform representative of a "0" is being propagated down the delay line. As previously stated, the peak 304 (FIG. 10(B)) may be $\phi_{03}$, i.e., the "0" signal applied to the "3" correlation network, the peak 306, the $\phi_{00}$, i.e. the "0" signal applied to the "0" correlation network, and the peak 308, $\phi_{06}$ i.e. the "0" signal applied to the "6" correlation network. Obviously the $\phi_{00}$ (peak 306) is the signal we desired to detect. The coarse signal straddles these peaks allowing for various character mutilations, and initiates the inverted sample interval (S.I.′) which is applied to transistor 246 which is driven as an emitter follower, the emitter tries to go negative but is prevented from doing so by transistors 238 and 290 which are in a state of conduction, thus keeping circuit point 302 at ground. Everytime the waveform (FIG. 10(B)) goes through a peak which is larger than any previous peak, as for example 304, 306, the transistors 238 and 290 cut off thus permitting point 302 to fall to −6 v. (clamped by the collector of transistor 237). The output of the differentiating circuit 268 is shown in FIG. 10(E). The crossover points result in an attempt to make the collector of the transistor 290 have square waveforms as shown in FIG. 10(F). The output of AND gate 236 (and also the buffer driver 237) is shown in FIG. 10(G); each time the waveform FIG. 10(G) has a square pulse output the character in the delay line is sampled. Thus the first peak is read as a "3." This information is only temporarily stored, for upon the next square pulse of FIG. 10(G) the system reads a "0." Upon the termination of the sample interval S.I., the logic circuitry will act upon the information last stored in the logic circuit. Since the system is responsive to the largest peak, and by design the correct signal will give the largest peak, the circuitry is supplying the correct identification of the character in the delay line.

In the embodiment illustrated in the drawings, some of the transistors are of the n-p-n type while others are of the p-n-p type. In the drawings, the convention has been adapted to depict a p-n-p transistor with the arrow on the emitter lead pointing toward the base, and conversely the n-p-n transistor is represented by having the arrow on the emitter lead pointing away from the base. As is well known in the art, n-p-n transistors may be substituted for p-n-p transistors provided that the polarities of the supply voltages and the polarities of the triggering signals are reversed.

Obviously many modfications and variations of the present invention are possible in the light of the above teachings. It is therefore to be understood that within the scope of the appended claims the invention may be practiced other than as specifically described and illustrated.

What is claimed is:

1. Magnetic character recognition circuitry for determining the optimum time $t_0$ at which comparison should be made between the readback voltage signal of a character to be identified and the correct one of a plurality of stored representations of all possible characters, comprising, means for developing a peaked waveform signal which is a function of the plurality of signals resulting from the application of said readback voltage signal to said stored representations, said peaked waveform signal having a maximum peak at $t_0$, coarse timing means adapted to sample said readback voltage signal and to generate a sample interval signal having a time width $(t_0-\Delta t_1)$ to $(t_0+\Delta t_2)$, and fine timing means enabled by said sample interval signal and adapted to receive said peaked waveform signal, for generating a fine timing signal at the occurrence of each ascending peak of said peaked waveform signal up to and including $t_0$, always ignoring peaks which are smaller than the largest previous peak.

2. Magnetic character recognition circuitry for determining the optimum time $t_0$ at which comparison should be made between the readback voltage signal of a character to be identified and the correct one of a plurality of stored representations of all possible characters, comprising, means for developing a peaked waveform signal which is a function of the plurality of signals resulting from the application of said readback voltage signal to said stored representations, said peaked waveform signal having a maximum peak at $t_0$, electromagnetic storage means for dynamically storing said readback voltage signal, coarse timing means adapted to sample said electromagnetic storage means and to generate a sample interval signal having a time width ($t_0-\Delta t_1$ to $t_0+\Delta t_2$), and fine timing means enabled by said sample interval signal and adapted to receive said peaked waveform signal, for generating a fine timing signal at the occurrence of each ascending peak of said peaked waveform signal up to and including $t_0$, always ignoring peaks which are smaller than the largest previous peak.

3. Magnetic character circuitry for determining the optimum time $t_0$ at which comparison should be made between the readback voltage signal of a character to be identified and the correct one of a plurality of stored representations of all possible characters, comprising, means for developing a peaked waveform signal which is a function of the plurality of signals resulting from the application of said readback voltage signal to said stored representations, said peaked waveform signal having a maximum peak at $t_0$, delay means for dynamically storing said readback voltage waveform signal, coarse timing means adapted to be coupled with said delay means and to generate a sample interval signal having a time width ($t_0-\Delta t_1$ to $t_0+\Delta t_2$), and fine timing means enabled by said sample interval signal and adapted to receive said peaked waveform signal, for generating a fine timing signal at the occurrence of each ascending peak of said peaked waveform signal up to and including $t_0$, always ignoring peaks which are smaller than the largest previous peak.

4. Magnetic character recognition circuitry according to claim 3 in which said delay means is an electromagnetic delay line.

5. Magnetic character recognition circuitry according to claim 3 in which said coarse timing means is arranged to sample said delay means at discrete fractional taps on said delay means in proximity to nominal $t_0$, the resulting derived, partially differentiated signal crossing the zero axis at $(t_0-\Delta t_1)$.

6. Magnetic character recognition circuitry according to claim 3 in which said coarse timing means is adapted to sample said delay means at discrete fractional taps on said delay means in proximity to nominal $t_0$, the resulting derived differentiated signal crossing the zero axis at the point $t_0-\Delta t_1$, and pick off means for determining the said crossover point.

7. Magnetic character recognition circuitry according to claim 3 in which said coarse timing means is adapted to sample said delay means at preselected fractional taps on said delay means in proximity to nominal $t_0$, the resulting derived signal crossing the time axis at the point $t_0-\Delta t_1$, pick-off means for determining the point $(t_0-\Delta t_1)$ and for delivering a pick-off signal, generator means for delivering said sample interval signal, and gating means adapted to receive said pick-off signal and for delivering a gating signal to said generator means to enable said sample interval signal to be developed.

8. Magnetic character recognition circuitry according to claim 3 in which said coarse timing means is adapted to sample said delay means at preselected fractional taps on said delay means in proximity to nominal $t_0$, the resulting derived signal crossing the time axis at the point $t_0-\Delta t_1$, pick-off means for determining the point $t_0-\Delta t_1$, and for delivering a pick-off signal, generator means for delivering said sample interval signal, gating means adapted to receive said pick-off signal and for delivering a gating signal to said generator means to enable said sample interval signal, and inhibiting means for delivering an inhibiting signal to said gating means which inhibiting signal is a function of said sample interval signal.

9. Magnetic character recognition circuitry according to claim 3 in which said coarse timing means is adapted to sample said delay means at preselected fractional taps on said delay means in proximity to nominal $t_0$, the resulting derived signal crossing the time axis at the point $t_0-\Delta t_1$, pick-off means for determining $t_0-\Delta t_1$, and for delivering a pick-off signal, generator means adapted for delivering said sample interval signal, gating means adapted to receive said pick-off signal and for delivering a gating signal to said generator means to enable said sample interval signal, inhibiting means adapted to deliver an inhibiting output signal of predetermined time width to said gating means, and pulse shaping means actuated by the said generator means and coupled with said inhibiting means for triggering said inhibiting means to deliver said inhibiting output signal to said gating means.

10. Magnetic character recognition circuitry according to claim 3 in which said coarse timing means is adapted to sample said delay means at preselected fractional taps on said delay means in proximity to nominal $t_0$, the resulting derived signal crossing the time axis at $t_0-\Delta t_1$, pick-off means for determining $t_0-\Delta t_1$, and for delivering a pick-off signal, multivibrator means for delivering said sample interval signal, gating means adapted to receive said pick-off signal and for delivering a gating signal to said multivibrator means to enable said sample interval signal, and differentiating pulse shaping means actuated by said multivibrator means for delivering an output pulse signal, voltage time base generator means adapted to be triggered by said output pulse signal to deliver an inhibiting output signal to said gating means for a predetermined time interval.

11. Magnetic character recognition circuitry according to claim 3 in which said fine timing means comprises an AND gating means, means for delivering a first input to said AND gating means on the occurrence of each peak of said peaked waveform signal up to time $t_0$, means for delivering the inversion of said sample interval signal to said AND gating means as a second input thereto, and means for delivering a third input to said AND gating means on the occurrence of each peak in said peaked waveform signal, whereby the AND gating delivers said fine timing signal upon the simultaneous occurrence of all three inputs.

12. Magnetic character recognition circuitry according to claim 3 in which said fine timing means comprises AND gating means, first input means for said AND gating means, said first input means comprising difference amplifier means, peak storage means for deriving a peak storage signal which is a function of the successively larger peaks of said peaked waveform signal, always ignoring peaks which are smaller than the largest previous peak, said difference amplifier means being adapted to receive said peaked waveform and peak storage signals and to deliver a first input signal when there is a difference in magnitude of the peaked waveform and peak storage signals respectively, means for delivering the inversion of said sample interval signal to said AND gate as a second input thereto, and means for delivering a third input to said AND gating means on the occurrence of each peak in said peaked waveform signal, whereby the AND gate delivers said fine timing signal upon the simultaneous occurrence of all three inputs.

13. Magnetic character recognition circuitry according to claim 3 in which said fine timing means comprises AND gating means, first input means for delivering a first input to said AND gating means on the occurrence of each peak of said peaked waveform signal up to and including time $t_0$, means for delivering the inversion of said sample interval signal to said AND gating means as a second input thereto, and means for delivering a third input to said AND gate, said third input means comprising differentiating means for differentiating said peaked waveform signal, the differentiated signal crossing the zero axis at the occurrence of each peak of said peaked waveform signal, pick-off means for ascertaining said crossover and applying a pick-off signal to said AND gate as said third input.

14. Magnetic character recognition circuitry according to claim 3 in which said fine timing means comprises AND gating means, first input means for said AND gating means, said first input means comprising means for variably attenuating said peaked waveform signal to provide an attenuated peaked waveform signal, peak storage means adapted to receive said attenuated peaked signal for deriving an output peak storage signal which is a function of the successively larger peaks of said peaked waveform signal, always ignoring peaks which are smaller than the largest previous peak, discharge circuit means enabled by said sample interval signal and operatively connected to enable both said attenuating and peak storage means, difference amplifier means adapted to receive said attenuated peaked signal and said peak storage signal as inputs, and to deliver a first input signal when there is a difference in the magnitudes of the peaked waveform and peak storage signals respectively, means for delivering the inversion of said sample interval signal to said AND gate as a second input thereto, and means for delivering a third input to said AND gating means on the occurrence of each peak in said peaked waveform signal, whereby the AND gate delivers said fine timing signal upon the simultaneous occurrence of all three inputs.

15. Magnetic character recognition circuitry according to claim 3 in which said fine timing means comprises AND gating means, first input means for delivering a first input to said AND gating means on the occurrence of each peak of said peaked waveform signal up to and including time $t_0$, means for delivering the inversion of said sample interval signal to said AND gating means as a second input thereto, and means for delivering a third input to said AND gate, said third input means comprising non-linear voltage divider means adapted to receive said peaked waveform signal, means for providing a phase lead, buffer amplifier means operatively interposed between said non-linear divider means and said phase lead means, differentiating means for receiving the output signal from said phase lead means and for differentiating said latter signal, pick-off and standardizing means for receiving the differentiated signal, ascertaining the point in time where the differentiated signal crosses the zero axis, and for standardizing the time width of said third input.

16. Magnetic character recognition circuitry according to claim 3 in which said fine timing means comprises AND gating means, first input means for said AND gating means, said first input means comprising means for variably attenuating said peaked waveform signal to provide an attenuated peaked waveform signal, peak storage means adapted to receive said attenuated peaked signal for deriving an output peak storage signal which is a function of the successively larger peaks of said peaked waveform signal, always ignoring peaks which are smaller than the largest previous peak, discharge circuit means enabled by said sample interval signal and operatively connected to enable both said attenuating and peak storage means, difference amplifier means adapted to receive said attenuated peaked signal and said peak storage signal as inputs and to deliver a first input signal when there is a difference in the magnitudes of the peaked waveform and peak storage signals respectively, means for delivering the inversion of said sample interval signal to said AND gating means as a second input thereto, and means for delivering a third input to said AND gate, said third input means comprising non-linear voltage divider means adapted to receive said peaked waveform signal, means for providing a phase lead, buffer amplifier means operatively interposed between said divider means and said phase lead means, differentiating means for receiving the output signal from said phase lead means and for differentiating said latter signal pick-off and standardizing means for receiving the differentiated signal, ascertaining the point in time where the differentiated signal crosses the zero axis, and for standardizing the time width of said third input.

References Cited in the file of this patent

UNITED STATES PATENTS

| | | |
|---|---|---|
| 2,924,812 | Merritt et al. | Feb. 9, 1960 |
| 2,927,303 | Elbinger | Mar. 1, 1960 |